No. 814,511. PATENTED MAR. 6, 1906.
T. G. BENNETT.
SPREADER FOR SHOT CARTRIDGES.
APPLICATION FILED DEC. 12, 1904.
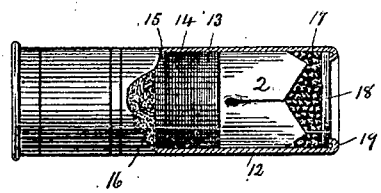
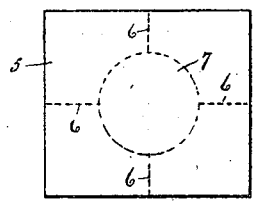
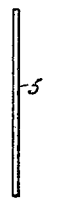
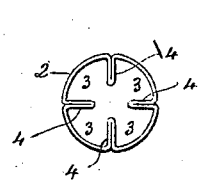
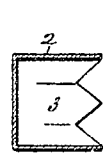
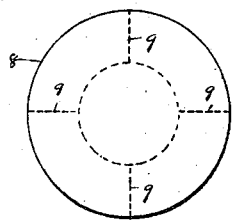
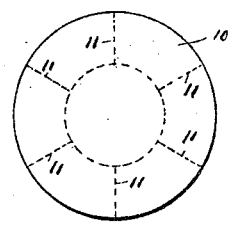

UNITED STATES PATENT OFFICE.

THOMAS G. BENNETT, OF NEW HAVEN, CONNECTICUT, ASSIGNOR TO WINCHESTER REPEATING ARMS CO., OF NEW HAVEN, CONNECTICUT, A CORPORATION.

SPREADER FOR SHOT-CARTRIDGES.

No. 814,511.      Specification of Letters Patent.      Patented March 6, 1906.

Application filed December 12, 1904. Serial No. 236,565.

*To all whom it may concern:*

Be it known that I, THOMAS G. BENNETT, a citizen of the United States, residing at New Haven, in the county of New Haven and State of Connecticut, have invented a new and useful Improvement in Spreaders for Shot-Cartridges; and I do hereby declare the following, when taken in connection with the accompanying drawings and the numerals of reference marked thereon, to be a full, clear, and exact description of the same, and which said drawings constitute part of this specification, and represent, in—

Figure 1, a view in side elevation of a cartridge containing one form which my improved spreader may assume, a portion of the shell being broken away to show the spreader and other elements of the load; Fig. 2, a view of one form of blank which I may employ for the production of my improved spreader; Fig. 3, an edge view thereof; Fig. 4, a plan view of the spreader as folded; Fig. 5, a view thereof in side elevation. Figs. 6 and 7 show other forms of blanks which I may employ, the broken lines on them indicating modes of folding them.

My invention relates to an improvement in spreaders for shot-cartridges or cartridges having multicharges of any form, the object being to produce a cheap and effective spreader adapted to be readily loaded into a shell and constructed with particular reference to spreading the charge without interfering with the velocity thereof as soon as the spreader leaves the muzzle of the gun.

With these ends in view my invention consists in a spreader consisting of a single piece of sheet-like material folded into a predetermined form, permitting its insertion into a cartridge and its unfolding as soon as it leaves the muzzle of the gun.

My invention further consists in a spreader having certain details of construction, as will be hereinafter described, and pointed out in the claims.

In carrying out my invention as shown in Figs. 1 to 5, inclusive, I produce a pocket-like or cup-like spreader 2, of cylindrical cross-section and longitudinally divided into four connecting shot-receiving compartments 3 by four inwardly-extending webs or partitions 4 by folding in any suitable manner a square sheet-like blank 5 on the broken lines 6 7 indicated on Fig. 2. By preference I shall use some sort of paper in the production of the spreaders; but I do not limit myself to the use of paper, as I might employ cloth, sized or otherwise adapted to hold its shape when folded, or sheet metal soft enough not to injure the gun-barrel, or, indeed, any other material capable of being produced in sheets and retaining to a measurable extent at least a predetermined folded form while in the shell. Nor do I limit myself to the employment of a rectangular blank or to spreaders having four compartments. Thus in Fig. 6 I have shown a circular blank 8, the broken lines 9 on which indicate how it will be folded to produce a pocket-like spreader of four connecting compartments. In Fig. 7 I have shown a circular blank 10, the broken lines 11 on which show how it may be folded to produce a pocket-like spreader of six compartments. The form of the blanks and the modes of folding them may be widely varied, and these illustrations will suffice for proof of that; but the blanks should be folded with reference to the unfolding of the spreaders immediately on their leaving the muzzle of the gun.

In using my improved spreader it is introduced into the shell closed end first and so as to rest upon the outer powder-retaining wad 13, which rests upon a similar but thicker wad 14, which in turn rests upon a thinner wad 15, directly confining the powder 16; but of course the number of powder-retaining wads and their relative thickness will vary in different kinds of shot-shells. After the spreader has been introduced into the shell the shot 17 is poured into the same and finds its way into the compartments of the spreader, the partition-walls of which in a sense divide the shot from itself. After the shot has been poured into the shell the same is closed by the shot-wad 18, held in place by crimping the extreme end of the shell, as at 19.

It seems sufficient to say of the operation of the spreader that when the cartridge is fired and the spreader leaves the gun-barrel it immediately unfolds and effects the spreading of the shot without interfering with the velocity thereof.

In view of the modifications suggested and of others which may obviously be made I would have it understood that I do not limit myself to the forms shown, but hold myself at liberty to make such departures therefrom as fairly fall within the spirit and scope of my invention.

Having fully described my invention, what I claim as new, and desire to secure by Letters Patent, is—

1. As a new article of manufacture, a shot or multicharge-spreader for cartridges, the said spreader consisting of a single piece of sheet-like material folded into a predetermined cup-like form permitting its insertion into a cartridge and its immediate unfolding on leaving the muzzle of the gun.

2. As a new article of manufacture, a shot or multicharge spreader for cartridges, the said spreader consisting of a single piece of sheet-like material folded into a predetermined form having inwardly-extending webs or partitions dividing it into connecting compartments, and adapting it to immediately unfold on its leaving the muzzle of the gun.

In testimony whereof I have signed this specification in the presence of two subscribing witnesses.

THOMAS G. BENNETT.

Witnesses:
DANIEL H. VEADER,
H. F. BEEBE.